United States Patent [19]

Rumbaugh

[11] Patent Number: 5,263,275
[45] Date of Patent: Nov. 23, 1993

[54] VARIABLE CIRCUMFERENCE ROD HANDLE

[75] Inventor: James T. Rumbaugh, Spirit Lake, Iowa

[73] Assignee: Berkley, Inc., Spirit Lake, Iowa

[21] Appl. No.: 866,863

[22] Filed: Apr. 10, 1992

[51] Int. Cl.⁵ ............................................. A01K 87/00
[52] U.S. Cl. ........................................ 43/23; 74/551.9; 273/73 J; 273/81 D
[58] Field of Search ................ 43/18.1, 23; 273/81 D, 273/81 R, 80 R, 73 J, 75; 74/551.9

[56] References Cited

U.S. PATENT DOCUMENTS

| | | | |
|---|---|---|---|
| 2,576,751 | 11/1951 | Dortmund | 273/81 D |
| 3,070,370 | 12/1962 | Steiner | 273/81 |
| 3,833,218 | 9/1974 | Frenkel et al. | 273/73 J |
| 3,833,219 | 9/1974 | Dean | 273/73 J |
| 3,915,021 | 10/1975 | Schwartz | 273/81 D |
| 3,968,965 | 7/1976 | Frenkel et al. | 273/73 J |
| 4,035,089 | 7/1977 | Schwartz et al. | 74/551.9 |

*Primary Examiner*—Kurt C. Rowan
*Attorney, Agent, or Firm*—Faegre & Benson

[57] ABSTRACT

A fishing rod handle of variable circumference permits adjustment to fit the hand size of an individual user and retains that size until again readjusted to a different circumference. A plurality of individual longitudinal spreaders are arranged circumferentially around the handle. Axially applied screw-action forces the individual spreaders to spread of bend outward. A resilient covering over the spreaders may be proved to lend a smooth surface to the handle at various possible circumferences.

13 Claims, 6 Drawing Sheets

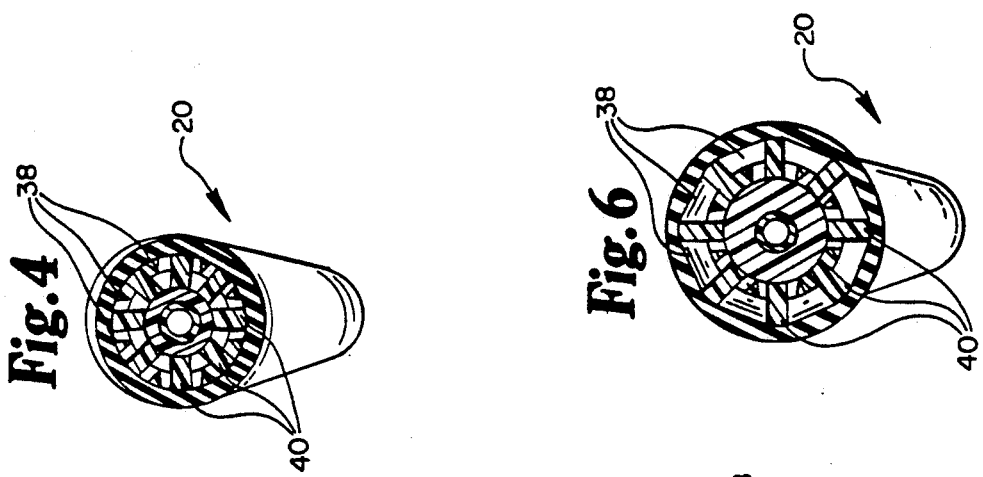
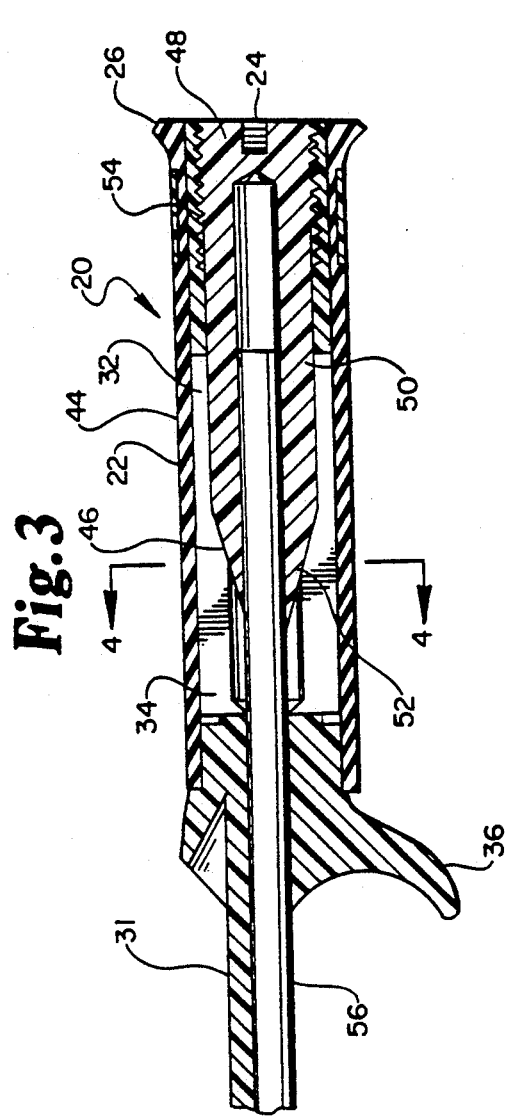
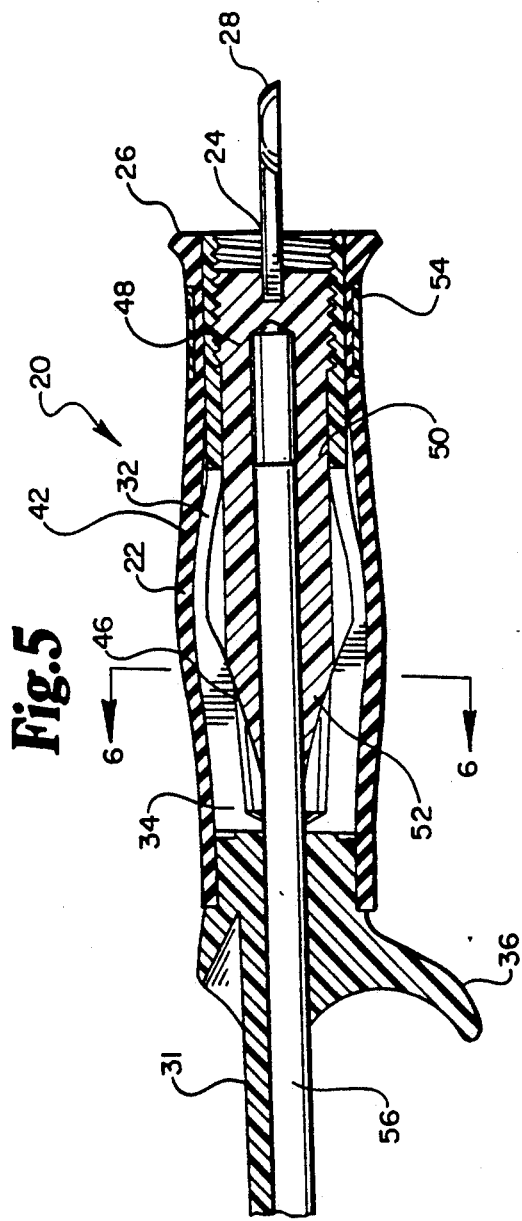

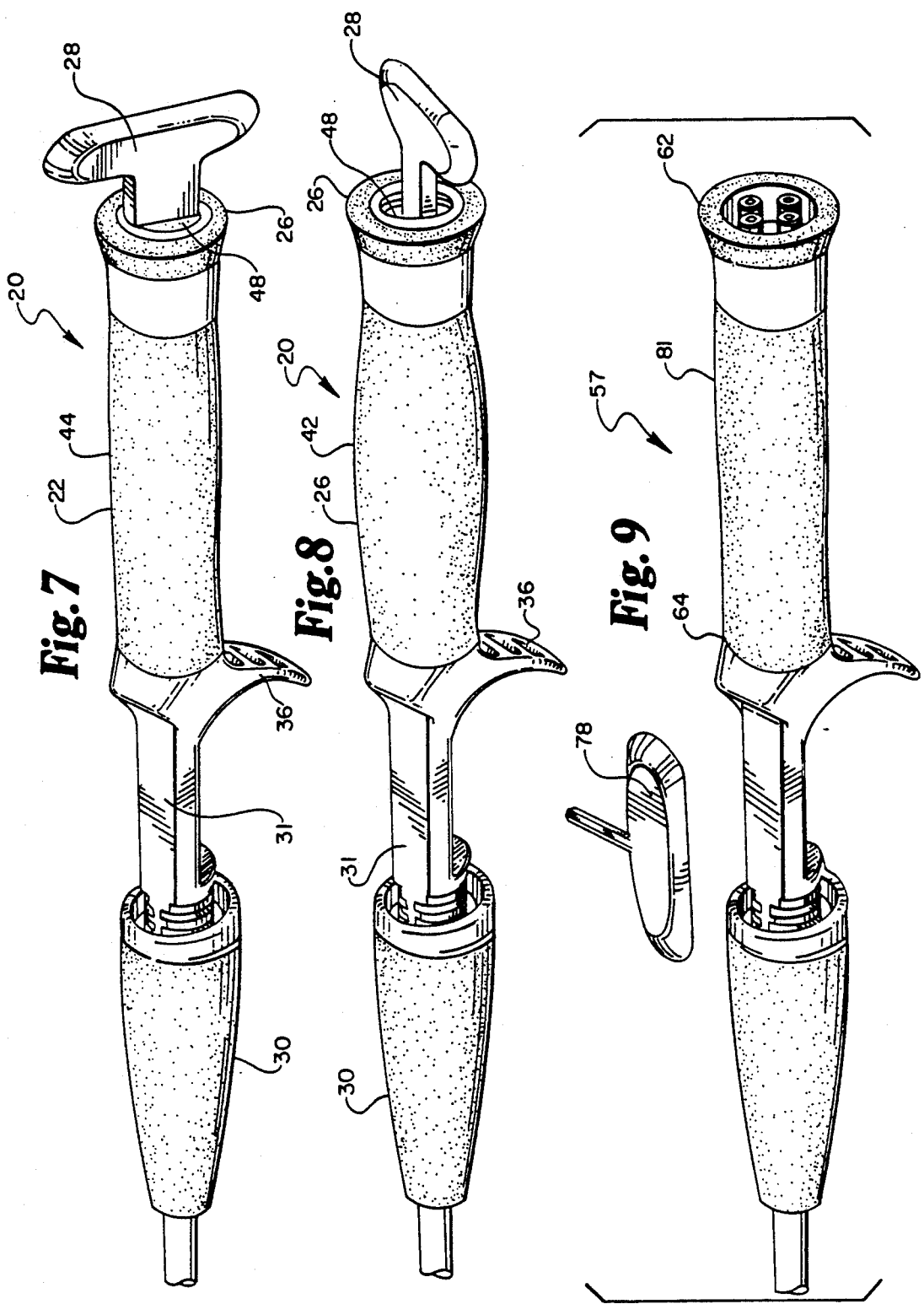

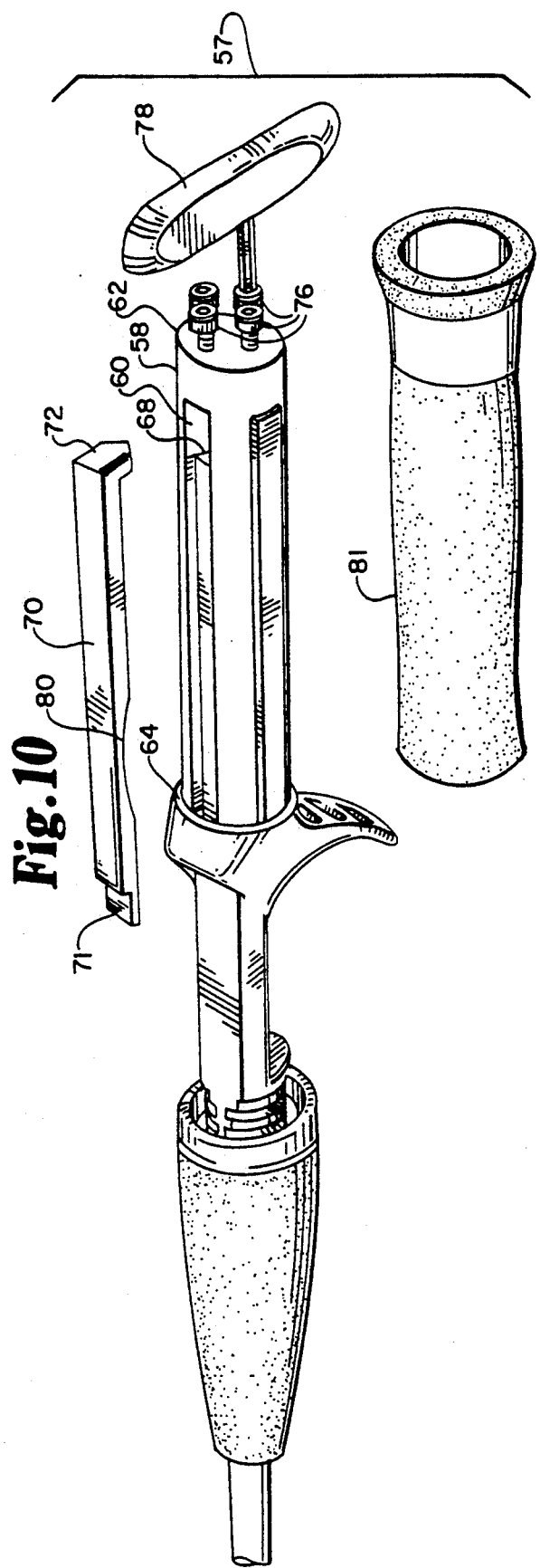
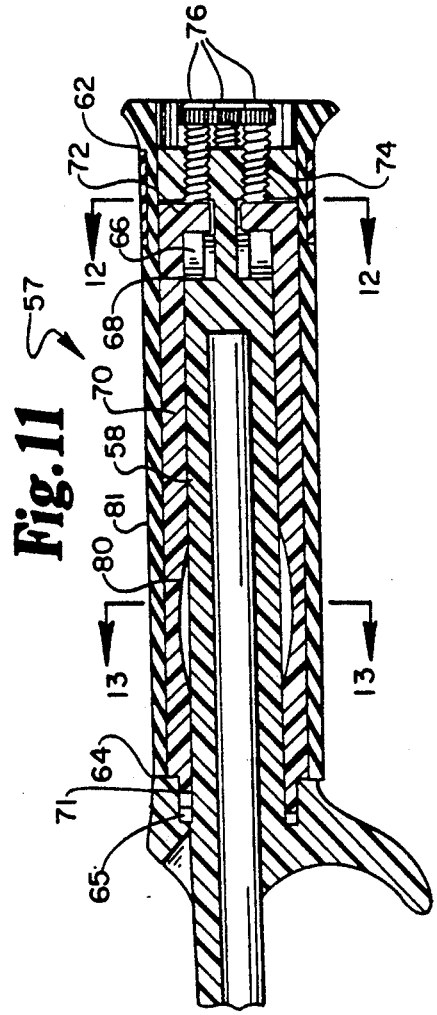
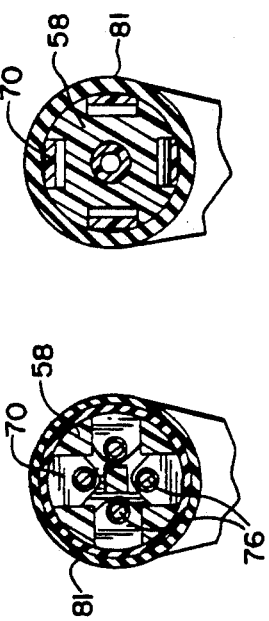
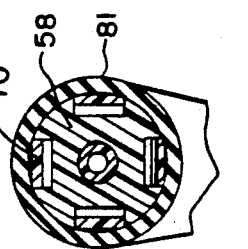

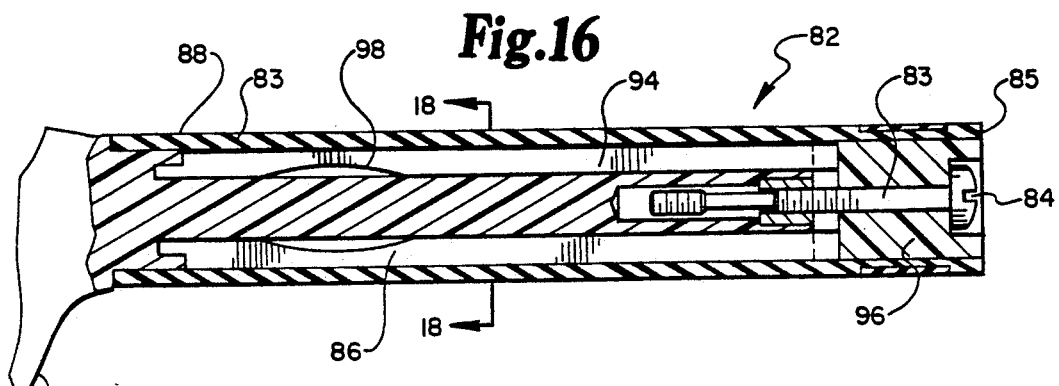
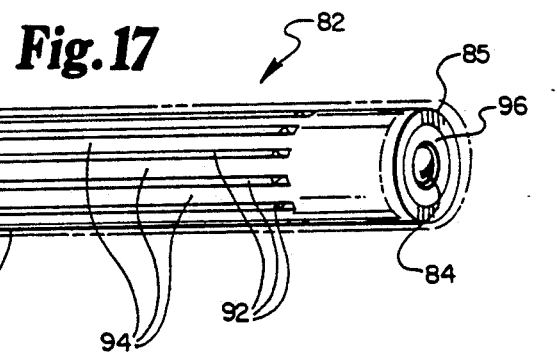
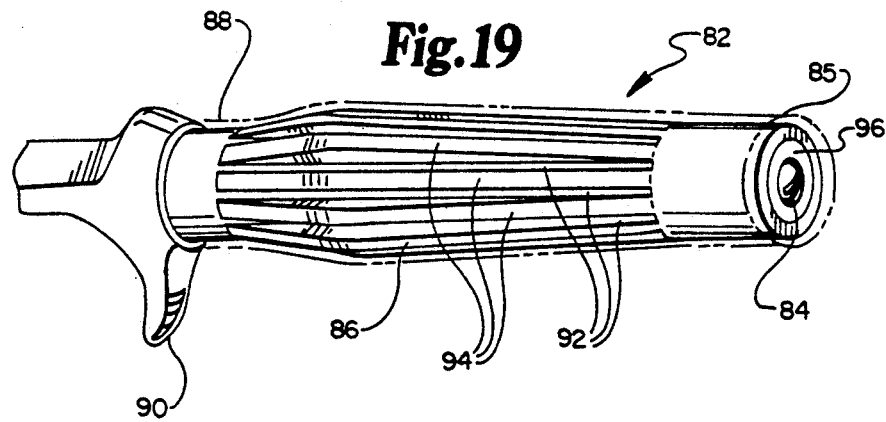

VARIABLE CIRCUMFERENCE ROD HANDLE

BACKGROUND OF THE INVENTION

This invention relates to a fishing rod handle of variable circumference, which permits adjustment to fit the hand size or comfort of an individual user and retains that size until again readjusted to a different circumference. Several means of adjusting the circumference of the rod handle are provided.

Various types of mechanisms for varying the circumference of the handles of hand-held tools, appliances and sporting equipment have been suggested.

U.S. Pat. No. 4,035,089, Schwartz, et al., issued Jul. 12, 1977, describes a mechanism for adjusting the circumference of a cylindrical handle which comprises a plurality of compressible O-ring elements supported by a cylindrical body section and spaced apart by spacer elements. An axially movable member compresses the O-rings to deformably enlarge their shape, thus enlarging the handle. The device is also said to be suitable for varying the handle size of fishing rods.

U.S. Pat. No. 3,968,965, Frenkel, et al., issued Jul. 13, 1976, describes a sports racket with radially movable wall plates and a rotatable element such as a rod axially carried within the handle. An expander assembly is carried on the rotatable member for applying pressure to the wall plates upon rotation of the rotatable member so as to vary the diameter of the handle.

U.S. Pat. No. 3,915,021, Schwartz, et al., issued Oct. 28, 1975, describes a cylindrical handle with walls arranged for radial movement. Upon rotation of a rotatable sleeve, an expander assembly exerts radial pressure on the walls to expand them. This device is also said to be useful for varying the handle size of fishing rods.

U.S. Pat. No. 3,070,370, Steiner, issued Dec. 25, 1962, describes a golf club with a tapered section extending from the upper end of the shaft with a sleeve having spaced slots positioned over the tapered section and also with means for securing the grip in adjusted position on the tapered section.

SUMMARY OF THE INVENTION

This invention provides a fishing rod handle of adjustable circumference. Although various different mechanisms are provided for adjusting the handle circumference, they all comprise a plurality of individual longitudinal spreaders arranged circumferentially around the handle. Axially applied screw-action forces the individual spreaders to spread or bend outward, thus enlarging the circumference of the rod handle. A resilient covering over the spreaders provides a smooth surface to the handle at various possible circumferences.

BRIEF DESCRIPTION OF THE DRAWINGS

FIG. 3 is a vertical section taken along the longitudinal axis of the embodiment of FIG. 1 and showing the proximal end of the rod therein.

FIG. 4 is a section taken along line 4—4 in FIG. 3.

FIG. 5 is a view similar to that of FIG. 3, showing the handle adjusted to near maximum handle circumference.

FIG. 6 is a section taken along line 6—6 in FIG. 5.

FIG. 7 is a view similar to that of FIG. 2 showing the screw key inserted into the slot in the plug.

FIG. 8 is a view similar to that of FIG. 7 showing the plug fully screwed in and the handle circumference adjusted to near maximum position, as in FIG. 5.

FIG. 9 is a view similar to that of FIG. 2 showing a second embodiment of the invention.

FIG. 10 is an exploded perspective view of the embodiment of FIG. 9.

FIG. 11 is a vertical section taken along the longitudinal axis of the embodiment of FIG. 9.

FIG. 12 is a section taken along line 12—12 in FIG. 11.

FIG. 13 is a section taken along line 13—13 in FIG. 11.

FIG. 16 is a view similar to FIGS. 3 and 11, showing a third embodiment of the invention.

FIG. 17 is a perspective view of the embodiment of FIG. 16 in near fully contracted form.

FIG. 18 is a section taken along line 18—18 in FIG. 16.

FIG. 19 is a perspective view of the embodiment of FIG. 16 in near fully expanded form.

DETAILED DESCRIPTION OF THE INVENTION

Figure 1:
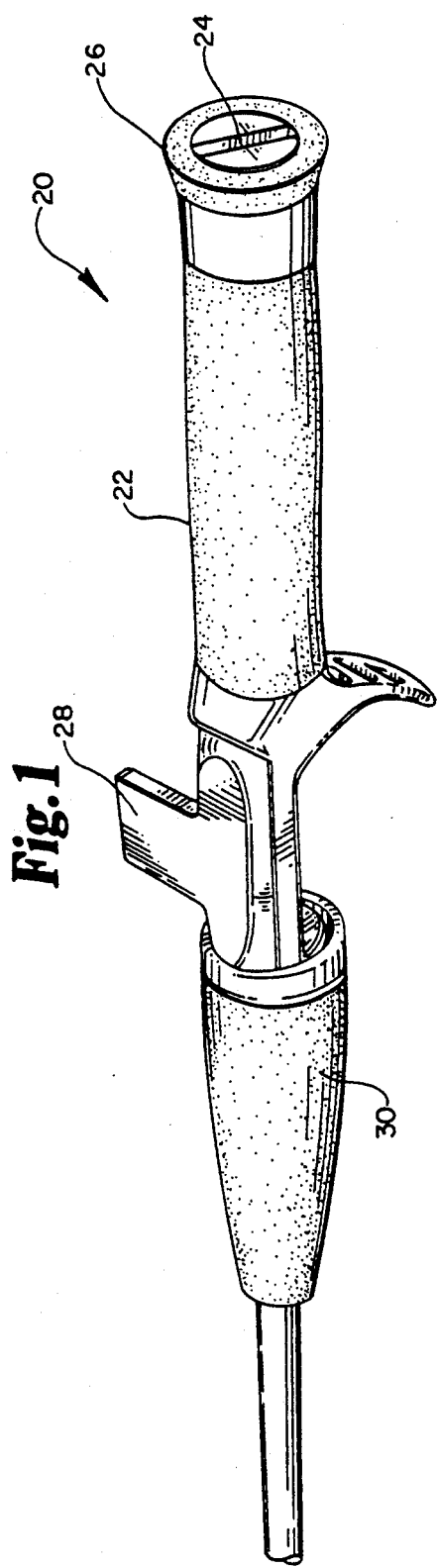
FIG. 1 is a fragmentary perspective detail of the butt end of a fishing rod handle and a first embodiment of the expander mechanism of this invention.
Figure 2:
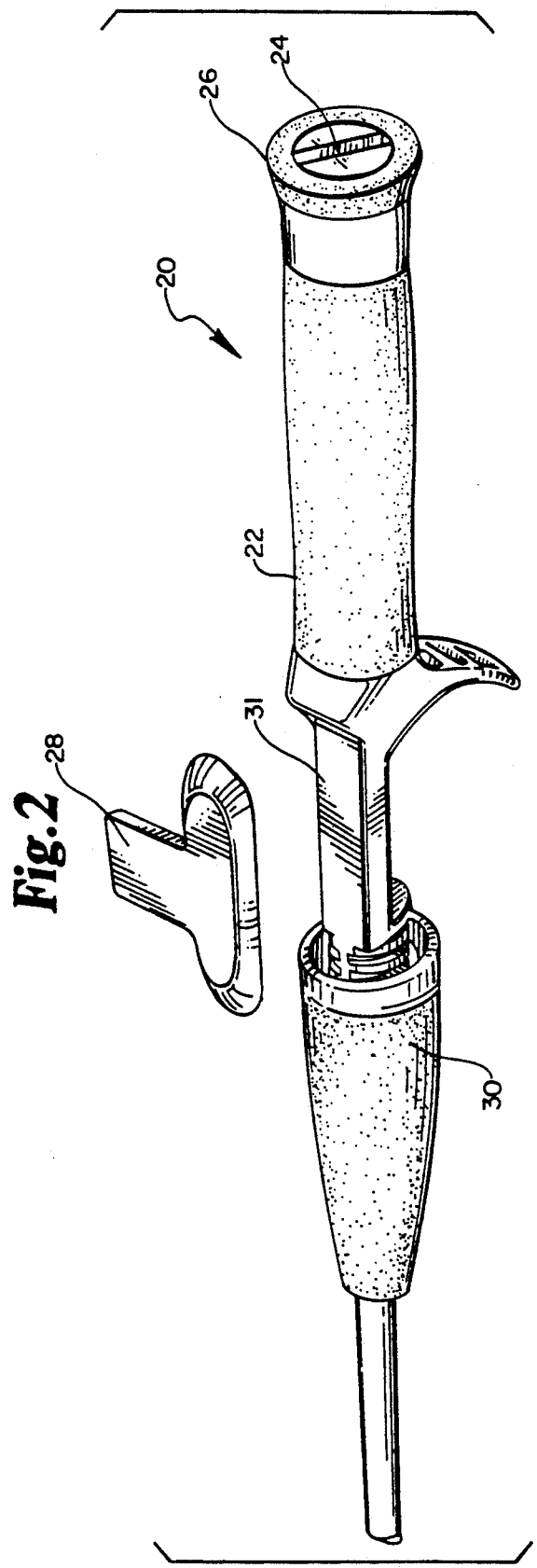
FIG. 2 is a fragmentary exploded perspective detail of the embodiment of FIG. 1.

As illustrated in FIG. 1, a first embodiment of rod handle 20 according to the present invention is shown fully assembled and in the smallest circumference position. In this configuration, the mechanism for expanding the circumference of the rod handle is concealed by handle grip 22, except for screw slot 24 in proximal end 26 of rod handle 20 and attached screw key 27. Although screw slot 24 can be engaged and turned by a conventional screw driver or similar tool, screw key 28 is provided for the convenience of the angler. To access screw key 28, foregrip nut 30 is unscrewed to remove screw key 28 and reveal a conventional reel seat 31, as illustrated in FIG. 2. By fitting screw key 28 into screw slot 24 and screwing clock-wise, the circumference of rod handle 20 will be enlarged, as will now be explained.

As illustrated in FIG. 3, fishing rod handle 20 has cylindrical shell 32 extending from proximal butt end 26 of the rod to distal end 34 adjacent finger grip 36. Shell 32 has longitudinal slits 38 extending from near the proximal end 26 to near the distal end 34 of shell 32, thereby forming spreaders 40. Interior cylindrical surface of shell 32 tapers from larger diameter surface 42 nearer proximal end 26 of shell 32 to smaller diameter surface 44 nearer distal end 34 of shell 32. Preferably, as shown in FIGS. 3 and 4, larger diameter surface 42 tapers abruptly to smaller diameter surface 44 at inclined plane 46. Proximal end 26 of shell 32 is internally threaded to receive plug 48, as will be described hereinafter.

Within shell 32 is positioned cylindrical bullet nosed plug 48, as illustrated in FIGS. 3–6. The central body section 50 of plug 48 has an exterior circumference of a size to be closely accommodated by the larger interior diameter surface 42 of shell 32, tapering to bullet-nose section 52. Threaded section 54 of plug 48 terminates in screw head slot 24. As further illustrated in FIGS. 3-6, the interior of plug 48 is hollow to accommodate the rod shank 56.

In order to enlarge the circumference of rod handle 20, plug 48 is screwed into shell 32, for example, by screw key 28, as shown in FIGS. 7 and 8. As bullet-nose section 52 of plug 48 confronts inclined plane 46 and continues to be screwed in, the central body section 50 of plug 48 presses outward inclined plane 46 and then smaller diameter surface 44 of shell 32, thus urging spreaders 40 outward, and thereby enlarging the circumference of rod handle 20. Resilient handle grip 22 lends a smooth uniform surface to rod handle 20 at all possible rod circumferences, as shown in FIGS. 7 and 8.

FIGS. 9-15 illustrate a second embodiment of a variable circumference rod handle 57 of the present invention. Generally cylindrical handle core 58 has longitudinal channels 60 extending from proximal butt end 62 to distal end 64 of handle core 58, each formed with an undercut 65 at the distal end, and each terminating adjacent proximal end 62 in well 66 extending further into core 58 and forming shoulder 68 within each channel 60. Positioned within each channel 60 is a spreader 70 having a tongue 71 at one end to be retained within undercut 65 and an expanded head 72 at the other end slidably positioned within well 66 for slidable abutment against shoulder 68, as will be described hereinbelow.

Proximal end 62 of core 58 is cylindrically solid with threaded holes 74 aligned with each channel 60 to receive screws 76 for individual actuation of each spreader 70. In order to enlarge the circumference of rod handle 57, each screw 76 is screwed into core 58, for example, by screw key 78, as shown in FIG. 10. As illustrated in FIGS. 9, 10 and 12, screws 76 preferably have a hex head and screw key 78 has a hex shank. Screw key 78 can be retained on reel seat between foregrip nut and finger grip in the same manner as screw key 28 in rod handle 20.

Figure 14:
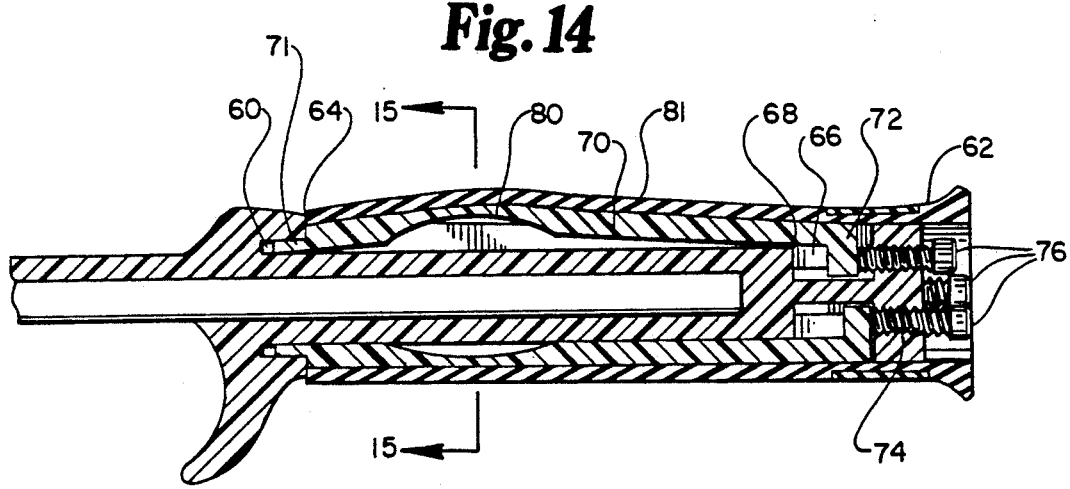
FIG. 14 is a section similar to that of FIG. 11 showing the handle circumference partially expanded.
Figure 15:
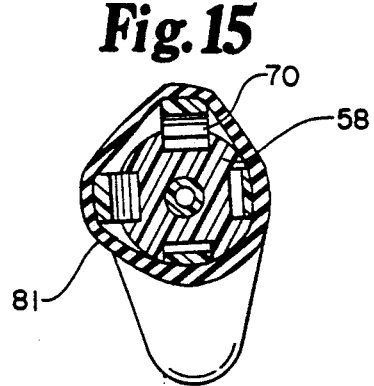
FIG. 15 is a section taken along line 15—15 in FIG. 14.

As each screw 76 is screwed in, screw 76 confronts spreader head 72 urging it slidingly distally within well 66 until spreader head 72 confronts shoulder 68, thus causing spreader 70 to bow outward, thereby enlarging the circumference of rod handle 57. Preferably, as shown in FIGS. 10, 11 and 14, spreaders 70 are formed with an undercut area 80 to facilitate outward bowing. Note that each spreader is individually actuated, so that both the contour and the circumference of handle 57 can be varied. Resilient handle grip 81 lends a smooth uniform surface to rod handle 57 at all possible rod circumferences, as shown in FIGS. 10 and 14.

FIGS. 16-19 illustrate a third embodiment of the present invention. As shown in FIG. 17, a third embodiment of rod handle 82 according to the present invention is in vertical section taken along its longitudinal axis and in the smallest circumference position, and showing the location of a hand grip 83. FIG. 17 shows a perspective view of the rod in the smallest circumference, illustrating screw slot 84 in proximal end 85 of rod handle 82. Screw slot 84 is engaged by a conventional screw driver or similar tool to turn screw shaft 83, although a screw key, similar to screw key 28 described above, can be provided if desired. By fitting any such tool into screw slot 84 and screwing screw shaft 85 clock-wise, the circumference of rod handle 82 will be enlarged, as will now be explained.

As illustrated in FIG. 16, fishing rod handle 82 has cylindrical cage 86, extending from proximal butt end 85 of rod 82 to distal end 88 adjacent finger grip 90. As explained above, the exterior surface of rod handle 82 is covered by resilient handle grip 83 to provide a smooth exterior surface at all circumferences. Cage 86 has longitudinal openings 92 extending from near the proximal end 85 to near the distal end 88 of cage 86, thereby forming expanders 94. Interior surface of cage 86 is generally uniformly cylindrical, except for area 98 of reduced radial thickness.

Proximal end of cage 86 is provided with cap 96 which closely engages screw shaft 83 for rotation therewith. As screw shaft 83 is turned clockwise, cap 96 presses longitudinally distally on expanders 94 forcing them to splay outward at area 98 of reduced radial thickness, and thus enlarging the circumference of rod handle 82, as shown in FIG. 19. FIG. 18 is a section taken along line 18-18 in FIG. 16, showing the location of the openings 92 and expanders 94.

What is claimed is:

1. A fishing rod handle of adjustable circumference comprising:
   a solid cylindrical core extending from a proximal butt end of said rod to a distal end, said core having longitudinal channels extending from the proximal to the distal end of said core, the proximal end of said core having a well extending further into the core and forming a shoulder within each channel;
   a spreader positioned within each channel, each spreader having a head slidably positioned within said well;
   such that, as pressure is applied to the spreaders from the proximal end, the spreaders are gradually bowed outward, thus enlarging the circumference of the handle.

2. A fishing rod handle according to claim 1, wherein the channels extend to less than the proximal end of the core.

3. A fishing rod handle according to claim 2, wherein the channels extend to less than the distal end of the core.

4. A fishing rod handle according to claim 1, wherein pressure is applied to each spreader by means of a screw in the proximal end of the core.

5. A fishing rod handle according to claim 4, wherein each screw is provided with a hex head and the handle is further provided with a hex key, which is storable on a reel seat of said rod by screw fit between a foregrip nut and a finger grip.

6. A fishing rod handle according to claim 1, wherein the core is encompassed by a resilient hand grip.

7. A fishing rod handle according to claim 1, wherein each spreader has an area of reduced radial thickness to facilitate outward bowing thereof under axially applied pressure.

8. A fishing rod handle of adjustable circumference comprising:
   a hollow cylindrical cage extending from a proximal butt end of said rod to a distal end, said cage having longitudinal openings extending from the proximal to near the distal end of said cage forming expanders;
   a cylindrical cap encompassing the expanders at the proximal end of the cage, said cap engaging a screw shaft longitudinally extending through a center of said cap for rotation with said screw;

such that, as the screw shaft is screwed into said cage, said cap is pressed longitudinally distally upon said expanders, gradually causing the expanders to splay outward, thus enlarging the circumference of the handle.

9. A fishing rod handle according to claim 8, wherein the expanders are formed with an area of reduced radial thickness to facilitate outward splaying of the expanders.

10. A fishing rod handle according to claim 8, wherein said handle is further provided with a screw key, which is storable on a reel seat of said rod by screw fit between a foregrip nut and a finger grip.

11. A fishing rod handle according to claim 8, wherein the cage is encompassed by a resilient hand grip.

12. A fishing rod handle of adjustable circumference comprising:

a cylindrical shell extending from a proximal butt end of said rod to a distal end, said shell having longitudinal slots extending from the proximal to the distal end of said shell forming spreaders, an interior cylindrical surface of said shell tapering from a larger diameter surface at the proximal end to a smaller diameter surface at the distal end thereof;

a cylindrical bullet-nosed plug screw-engageable with said shell, said plug having an exterior diameter sized to fit the larger diameter of said shell; and a screw key, sized and adapted for engaging a screw slot in an end of the plug opposite the bullet nose, said key storable on a reel seat of said rod by screw fit between a foregrip nut and a finger grip;

such that, as the bullet nose of said plug is screwed distally into said shell from the larger to the smaller diameter surface, the plug gradually pushes the spreaders outward, thus enlarging the circumference of the handle.

13. A fishing rod handle of adjustable circumference comprising a shaft at a butt end of said rod;

a cylindrical shell concentrically and longitudinally aligned about said shaft extending from a proximal butt end of said rod to a distal end, said shell having longitudinal slots extending from the proximal to the distal end of said shell forming spreaders, an interior of said shell tapering from a larger diameter surface at the proximal end to a smaller diameter surface at the distal end;

a cylindrical bullet-nosed plug cylindrically and longitudinally aligned within said shell about said shaft and screw engageable with said shaft, said plug having an exterior diameter sized to fit the larger diameter of said shell; and said handle is further provided with a screw key, sized and adapted for engaging a screw slot provided in an end of the plug opposite the bullet nose, which screw key is storable on a reel seat of said rod by screw fit between a foregrip nut and a finger grip;

such that, as the bullet nose of said plug is screwed distally onto said shaft within said shell from the larger to the smaller diameter surface, the plug gradually bows the spreaders outward, thus enlarging the circumference of the handle.

* * * * *